United States Patent [19]
Beall et al.

[11] Patent Number: 5,350,716
[45] Date of Patent: Sep. 27, 1994

[54] FIBER-REINFORCED COMPOSITES

[75] Inventors: George H. Beall, Big Flats; Kenneth Chyung; Mark P. Taylor, both of Painted Post, all of N.Y.

[73] Assignee: Corning Incorporated, Corning, N.Y.

[21] Appl. No.: 638,994

[22] Filed: Aug. 9, 1984

[51] Int. Cl.$^5$ .............................. C03C 10/04
[52] U.S. Cl. .......................... 501/5; 501/38; 501/88
[58] Field of Search ............ 501/3, 5, 38, 88

[56] References Cited

U.S. PATENT DOCUMENTS

| | | | |
|---|---|---|---|
| 4,314,852 | 2/1982 | Brennan et al. | 501/88 |
| 4,386,162 | 5/1983 | Beall | 501/3 |
| 4,399,231 | 8/1983 | Prewo et al. | 501/88 X |
| 4,410,635 | 10/1983 | Brennan et al. | 501/5 X |
| 4,415,672 | 11/1983 | Brennan et al. | 501/5 X |
| 4,485,179 | 11/1984 | Brennan et al. | 501/88 X |
| 5,246,889 | 9/1993 | Kasuga et al. | 501/5 X |

Primary Examiner—Peter A. Nelson
Attorney, Agent, or Firm—C. S. Janes, Jr.

[57] ABSTRACT

There is disclosed a fiber-reinforced composite having a high degree of fracture toughness and being composed of a glass-ceramic matrix reinforced with silicon carbide or graphite type fibers, the predominant crystal phase of the matrix glass-ceramic being canasite, and/or agrellite, and/or fedorite.

1 Claim, 2 Drawing Sheets

FIBER-REINFORCED COMPOSITES

BACKGROUND OF THE INVENTION

This invention is concerned with fiber-reinforced composites. It is particularly concerned with composites embodying graphite or silicon carbide type fibers as reinforcement for a glass or ceramic type matrix.

Graphite/glass composites are well known. Several recent patents (U.S. Pat. No. 4,265,968, U.S. Pat. No. 4,263,367, U.S. Pat. No. 4,256,378, U.S. Pat. No. 3,681,187 and U.S. Pat. No. 3,607,608) are concerned with such composites. These employ a borosilicate glass, available from Corning Glass Works under Code No. 7740, as an exemplary matrix glass.

The reinforcement provided by fibers is usually evaluated in terms of material strength. A measure commonly used is ultimate tensile strength. This measure is contributed to by both the inherent strength of the fibers and the bond that is engendered between the fibers and the matrix being strengthened.

The quality of a fiber-reinforced composite may also be evaluated in terms of fracture toughness and fatigue resistance. These properties depend on inherent fiber strength and bond strength as well, but also reflect micro-cracking tendencies in the matrix. More accurately, they reflect the resistance to such tendencies.

As further illustrated later, toughness may be evaluated from the shape of a load deflection curve generated when a test sample is progressively loaded in a bending apparatus to the point of fracture. Maximum stress may then be calculated. The ascending curve for a strong and/or brittle composite tends to drop precipitously when the maximum load is reached. In contrast, the curve for a tough material tends to drop rather gradually. Physically, this is manifested as a non-spreading, or slowly developing, crack.

PURPOSES OF THE INVENTION

The basic purpose is to provide novel fiber-reinforced composites that are lightweight and relatively inexpensive to produce.

A particular purpose is to provide a composite embodying a glass-ceramic matrix reinforced with carbon or silicon carbide fibers.

Another purpose is to provide such composites having superior fracture toughness.

A further purpose is to utilize a known glass-ceramic material as a matrix in a fiber-reinforced composite.

SUMMARY OF THE INVENTION in furtherance of these and other purposes, our invention is a fiber-reinforced composite having a high degree of fracture toughness and being composed of a glass-ceramic matrix reinforced with silicon carbide or carbon fibers, the predominant crystal phase of the matrix glass-ceramic being canasite and/or agrellite and/or fedorite. Expressed in weight percent on an oxide basis as calculated from the glass batch, the matrix glass-ceramic will consist essentially of 45–75% $SiO_2$, 8–30% CaO, 3.5–12% F, 3–15% $Na_2O$, 0–20% $K_2O$, 5–25% $Na_2O+K_2O$ 0–6% $B_2O_3$, 0–7% $Al_2O_3$ and 0–12% $ZrO_2$.

In a preferred embodiment, the crystal phase in the matrix in substantially canasite and the matrix consists essentially, in weight percent as calculated from the glass batch, of 50–65 $SiO_2$, 15–24 CaO, 5–9 F, 3–13 $Na_2O$, 3–15 $K_2O$, the $Na_2O+K_2O$ being 11–22, 0–3 $B_2O_3$, 0–3 $Al_2O_3$ and 0–8 $ZrO_2$.

The invention further comprehends a method of producing a fiber-reinforced composite having a high degree of fracture toughness which comprises melting a glass having a composition, as calculated in weight percent on an oxide basis, consisting essentially of 45–75 $SiO_2$, 8–30 CaO, 3.5–12 F, 3–15 $Na_2O$, 0–20 $K_2O$, 5–25 $Na_2O+K_2O$, 0–6 $B_2O_3$, 0–7 $Al_2O_3$ and 0–12 $ZrO_2$, comminuting the glass and mixing the powdered glass with a vehicle to form a slurry, impregnating a multifiber body of graphite or silicon carbide fibers with the slurry, drying and cutting the impregnated body to form a shaped mass, heating the shaped mass in a die to a fluid state, applying pressure to consolidate, and crystallizing the glass to a glass-ceramic.

PRIOR LITERATURE

In addition to the graphite/glass composite patent disclosures mentioned earlier, several other United States Patents disclose glasses and/or glass-ceramics as a matrix. These include U.S. Pat. No. 4,314,852, U.S. Pat. No. 4,324,843, U.S. Pat. No. 3,161,473 and U.S. Pat. No. 3,371,995.

U.S. Pat. No. 4,386,162, issued May 31, 1983 to G. H. Beall, discloses highly crystalline glass-ceramic materials demonstrating high intrinsic mechanical strength and toughness and containing crystals of canasite and/or agrellite and/or fedorite as the predominant crystal phase. A composition range is $SiO_2$ 45–75, CaO 8–30, 3.5–12 F, 3—15 $Na_2O$, 0–20 $K_2O$, 5–25 $Na_2O+K_2O$, 0–6 $B_2O_3$, 0–7 $Al_2O_3$ and 0–12 $ZrO_2$. These materials are disclosed as having particular utility in domestic dishes where high strength and toughness without surface compressive stress provides strength without violent breakage.

GENERAL DESCRIPTION OF THE INVENTION

The invention is based on our perception that the glass-ceramic materials disclosed in Beall U.S. Pat. No. 4,386,162 would function as a matrix capable of being strengthened by reinforcing, carbon-type fibers. It is further based on our discovery that the composites thus produced provide superior fracture toughness relative to fiber-reinforced glass-ceramics heretofore available.

Thus, the glass-ceramics suitable for present use are those described and defined in the Beall patent. Accordingly, to avoid repetition, the entire teaching and disclosure of the patent are incorporated herein by reference.

Briefly, the patent teaches a range of glass compositions, the glasses of which are capable of crystallizing to provide glass-ceramics with a predominant canasite, and/or agrellite, and/or fedorite crystal phase. For present purposes, a suitable glass batch is formulated, mixed and melted. The melt is cooled below the glass transformation range and molded to desired shape, or quenched, depending on subsequent handling.

The clear glass thus produced may be comminuted, as by ball milling, to a size of 10 to 15 microns. The powdered glass is then dispersed in a vehicle, which may be aqueous and preferably contains a suspending medium, to form a slurry. Propanol may be employed as an alternative, non-aqueous vehicle.

The glass slurry thus produced is now intermingled with the carbon or silicon carbide fibers. In one convenient procedure, a multi-fiber strand or mat is passed through the suspended glass slurry to impregnate the strand or mat with glass powder. Various mechanical expedients may be employed to spread the fiber body and facilitate complete wetting and impregnation of the fibers.

The impregnated fiber body may be stored and dried as a prepreg. Subsequently, the prepreg may be cut to desired form for further processing which may include stacking disks cut from a mat. If an organic binder is employed, it may be burned out in a preliminary heat treatment or firing.

The prepreg plys are placed in suitable dies for consolidation in a vacuum hot press. Several plys may be stacked if necessary.

Hot pressing includes pumping the sample to a low pressure, heating to a predetermined target temperature, applying pressure for an appropriate time and cooling. The heat-up schedule is determined by the viscosity characteristics of the matrix glass. Pressures typically are on the order of one to two Kpsi and are maintained for up to an hour to secure adequate fiber dispersal and consolidation.

The composites thus produced are then given a further heat treatment to crystallize the glass matrix. The body may then be prepared for a strength test wherein the sample is suspended in a three point bend apparatus and loaded to a point of fracture to determine maximum stress and character of the curve generated.

SPECIFIC DESCRIPTION

In order to further illustrate the invention, the results of several specific studies are presented. Three glasses, adapted to thermal crystallization to form canasite type glass-ceramics, were melted for use in the studies. A sample of Corning Code 7740 glass was employed for comparison testing.

The crystallizable glass compositions, as calculated in parts by weight on an oxide basis, were:

|                  | A   | B    | C    |
|------------------|-----|------|------|
| $SiO_2$          | 52  | 57.5 | 57   |
| CaO              | 12  | 11.4 | 11.0 |
| $CaF_2$          | 14  | 12.0 | 13.0 |
| $Na_2O$          | 7   | 8.8  | 8.0  |
| $K_2O$           | 9   | 8.9  | 9.0  |
| $ZrO_2$          | 6   | —    | —    |
| $Al_2O_3$        | —   | 2.0  | 2.0  |

Glass batches were mixed from conventional materials and placed in platinum crucibles for melting at 1300° C. for eight (8) hours. Each melt was quenched to a clear glass by pouring on a steel slab. The glass was then milled in an alumina ball mill to provide a subdivided grain size of 10–15 microns.

Viscosity-temperature measurements were made by the concentric cylinder method on Glass B at a series of viscosity levels to determine desired processing conditions. The values determined were:

| Viscosity (Poises) | Temperature °C. |
|--------------------|-----------------|
| $10^2$             | 1223            |
| $10^3$             | 1000            |
| $10^4$             | 888             |
| $10^5$             | 795             |
| $10^6$             | 733             |
| $10^7$             | 684             |

Three (3) types of fibers were combined with these glasses, as well as with Corning Code 7740 glass, to form fiber-reinforced composites for comparisons testing. The fibers, together with their reported intrinsic properties, were:

|                         | UTS (Kpsi) | Density (g/cm³) | Young's Modulus (Mpsi) |
|-------------------------|------------|-----------------|------------------------|
| Graphite (Hercules HMS) | 320        | 1.83            | 53                     |
| Graphite (Ni-Coated)    | 350        | 2.35            | 34                     |
| Silicon Carbide (Nicalon) | 390      | 2.55            | 27                     |

The Hercules fiber was a standard graphite fiber supplied in multi-fiber form by Hercules, Inc. The nickel-coated fiber was a fiber specially prepared by Electrometalloid of Irvington, N.Y. and now available from American Cyanamid. The silicon carbide fiber was supplied under tile trademark NICALON by Nippon Carbon of Yokohama, Japan in a tow of about 500 fibers. These fibers are not stoichiometric SiC, but are commonly known and marketed as silicon carbide fiber.

Each multi-fiber tow or mat was then introduced into a tank containing a slurry of glass suspended in an aqueous vehicle containing organic binders and plasticizers. A typical slurry contained 800 grams of vehicle solution, and 325 grams of glass. As the fiber mass passed through the slurry, it became thoroughly impregnated, a typical sample being approximately half glass and half fiber when dried.

The impregnated yarn was wound on a film-covered square drum and dried overnight. The prepregs thus produced could either be stored in plastic bags, or immediately cut to the size and shape desired for pressing.

Disks with diameters slightly under 3" were cut from the prepreg mat. Ten disks were then stacked in a 3" I.D.×4" O.D. graphite mold with their fiber directions as closely aligned as possible. Mo-foil disks were placed top and bottom to protect the composite from the graphite die. The volatiles were burned out by heating the loaded molds to 300° C. in an inert atmosphere in the case of graphite fibers, and 450° C. in air in the case of the silicon carbide fibers.

Consolidation was carried out in a Centorr vacuum hot press equipped with tungsten wire mesh elements which formed a 4½" diameter hot zone. The die was supported on a 2" graphite rod and pressure was applied from a second graphite rod connected to an hydraulic ram above the furnace. Furnace temperatures were measured on a W5%Re vs W26%Re thermocouple located approximately 1 cm from the mold surface. Pressures were calculated from the hydraulic pressure gauge.

A typical run was as follows:
1) Load die into the hot zone and apply 368 psi holding pressure. Pump chamber to $1\times10^{-4}$ torr.
2) Heat the chamber to 650° C. as fast as outgassing will allow. This can be as fast as 30° C./min if the molds are stored in a drying oven before use. The highest tolerable pressure is $8\times10^{-4}$ tort. Hold 15 minutes to allow outgassing.
3) Heat to maximum temperature at 5° C./min. This rate is about as fast as outgassing will allow.
4) Apply 1500 psi pressure at the target temperature.
5) Hold at maximum temperature for 30 minutes. Most ram movement takes place over a few minutes when the glass reaches a viscosity of about $10^9$, but the composite may not consolidate well at the center of the disk without the hold. This is especially true at minimum pressing temperatures.

6) Shut off furnace power and back-fill with Ar gas to speed cooling.

The foregoing does not represent critical conditions, and should be regarded as essentially exemplary. For example, after step (1), the operation might be carried out in a nitrogen atmosphere, rather than under vacuum. Likewise, tungsten heating elements may be replaced by graphite, or other, heating elements. Also, consolidation may proceed at lower mechanical pressures, an essential condition being that intimate contact is maintained between the fibers ant the matrix material.

It had previously been demonstrated that hot pressing at a matrix viscosity of $10^6$ poises provided good fiber separation and densification. The temperature corresponding to $10^6$ poises for Code 7740 was 1095° C., and that for the canasite glasses was 733° C. Accordingly, these were taken as target temperatures in the hot pressing operations.

The composites were ground flat and parallel with 325 grit medium, then cut into mechanical test specimens measuring 2.5"×0.18×0.10". The uncoated graphite/7740 specimen was somewhat thinner due to an overflash of material during hot pressing. Strengths were measured in a three point bend apparatus with a span of 1.5 inches by progressively loading the sample to its point of fracture, the maximum stress then being calculated.

Toughness was estimated from the shape of the load-deflection curve after the maximum load had been applied. Three general types of behavior were observed: an instantaneous drop to zero stress characteristic of brittle behavior; an instantaneous drop to a fraction of the maximum stress (usually 30-60%) followed by a gradual decrease with increasing strain; a gradual drop in stress after the maximum, usually through a series of small instantaneous drops. The first type is usually associated with very weak composites, the second with the strongest composites, and the third with the toughest composites.

Figure 1:
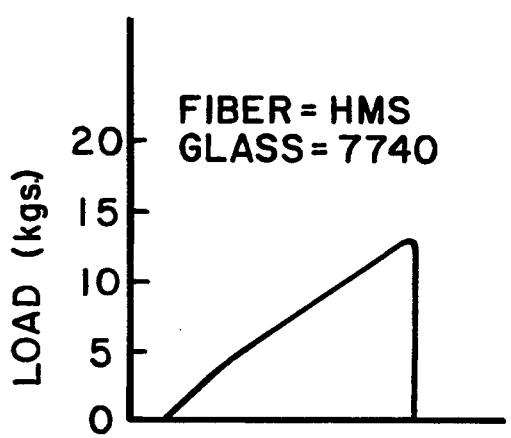
FIGS. 1-5, inclusive, show, graphically, load-deflection curves. In these FIGURES, the horizontal or base line represents deflection, and load applied on the sample is plotted in kilograms along the vertical.

The curve of FIG. 1 is based on measurements made with a composite in which a Code 7740 glass matrix is combined with standard, uncoated graphite fibers identified by the Hercules designation "HMS".

Figure 2:
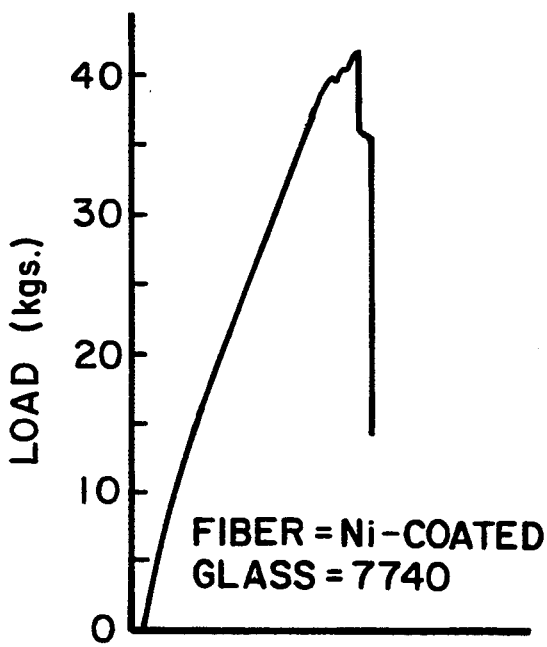

The curve of FIG. 2 is based on measurements made on a composite composed of nickel-coated graphite (Ni-Coated) fibers embedded in a Code 7740 glass matrix.

Figure 3:
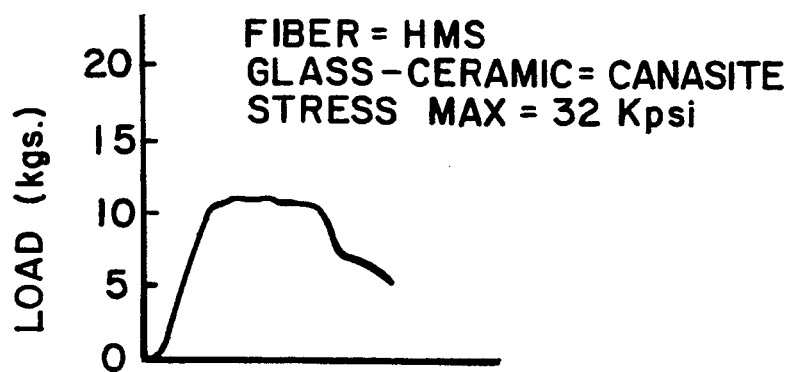

The curve of FIG. 3 is based on measurements made on a composite composed of uncoated graphite fibers (HMS), as described in respect to FIG. 1, embedded in a canasite glass-ceramic matrix having the composition of Example A in the composition table earlier.

Figure 4:
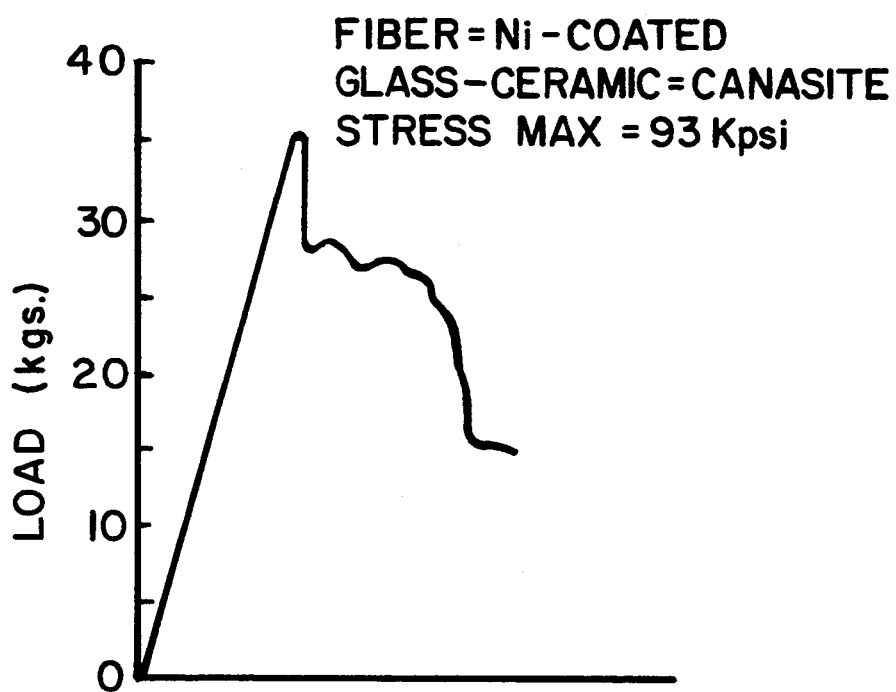

The curve of FIG. 4 is based on measurements made on a composite composed of nickel-coated fibers (as in FIG. 2) embedded in the canasite glass-ceramic matrix of FIG. 3.

Figure 5:
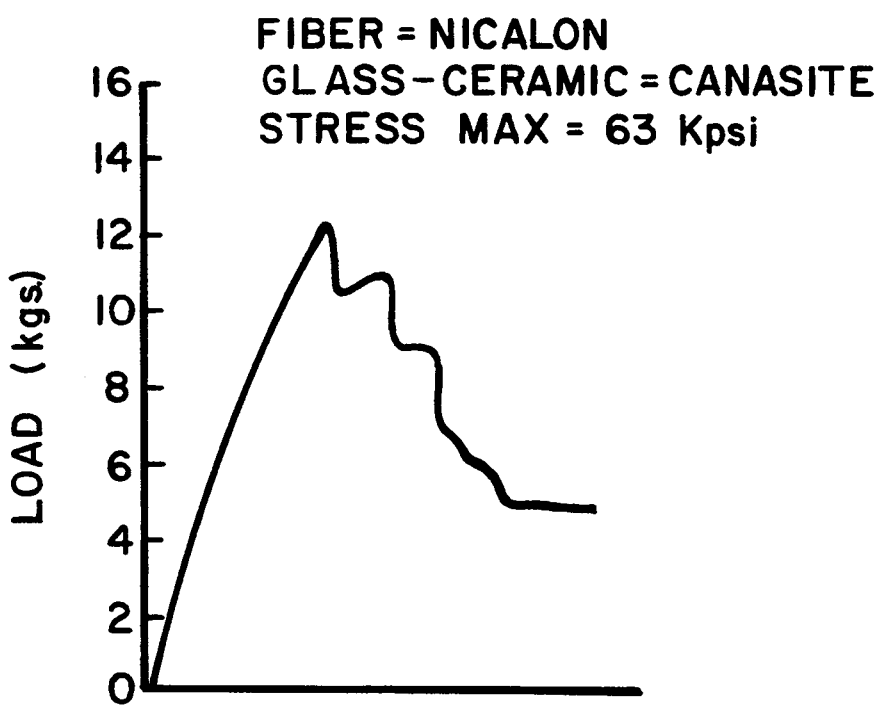

The curve of FIG. 5 is based on measurements made on a composite composed of silicon carbide (NICALON) fibers embedded in a canasite glass-ceramic matrix having the composition of Example A in the composition table above.

DESCRIPTION OF THE INVENTION

The components and the characteristic data for the composites of the five FIGURES may be summarized as:

| FIG. | Fiber | Matrix | Ultimate Tensile Strength (Kpsi) |
| --- | --- | --- | --- |
| 1 | Uncoated Graphite (HMS) | Code 7740 | 35 |
| 2 | Ni-Coated Graphite | Code 7740 | 110 |
| 3 | Uncoated Graphite (HMS) | Canasite | 32 |
| 4 | Ni-Coated Graphite | Canasite | 93 |
| 5 | Silicon Carbide (Nicalon) | Canasite | 63 |

The canasite load-deflection curves of FIGS. 3, 4 and 5 are characteristic of the third type of curve described above and represent very tough composites. Even after passing the maximum stress, the test specimen tends to return to its original shape and is very difficult to break. The 7740 matrix composites are characterized by the first or second type of load-deflection curve wherein the stress rises to a high maximum value, but then falls instantly.

The areas under the curves show that the canasite matrix composites require more energy for failure, especially just after the critical stress has been passed. Many of the failures seem to be parallel to the fibers. The high strength and fracture toughness of the highly interlocking canasite matrix seems to delay this failure mode until higher stress intensities are reached. Typical abraded MOR on canasite glass-ceramic is 40-50 Kpsi with an elastic modulus of ~12 Mpsi.

The invention was further studied using a crystallizable glass having the composition of Example C in TABLE I.

The glass was prepared as described above. Fiber impregnation and hot pressing were also carried out as described. The impregnated fiber disks were hot pressed at a higher temperature of about 950° C. There have been indications the higher temperature produces a somewhat stronger product. Subsequently, the glass was crystallized to provide a typical canasite crystal phase and structure.

Composites were prepared employing both low-oxygen (11%), silicon carbide (NICALON) fiber and standard Hercules HMS graphite fiber in a matrix of Glass C which was then crystallized to a canasite glass-ceramic. MOR measurements on the composites showed 122±10 Kpsi for composites with the silicon carbide fiber and 47±7 for composites with the graphite fibers.

We claim:

1. A fiber-reinforced composite having a high degree of fracture toughness and being composed of a glass-ceramic matrix reinforced with silicon carbide fibers, the crystal phase of the matrix glass-ceramic being essentially completely canasite, and the matrix composition, in weight percent as calculated on an oxide basis, consisting essentially of 50-65% $SiO_2$, 15-24% CaO, 5-9% F, 3-13% $Na_2O$, 3-25% $K_2O$, 11-22% $Na_2O + K_2O$, 0-3% $B_2O_3$, 0-3% $Al_2O_3$, and 0-8% $ZrO_2$.

* * * * *